United States Patent
Patel et al.

(10) Patent No.: US 12,238,530 B2
(45) Date of Patent: Feb. 25, 2025

(54) USING UNLICENSED AND LICENSED SPECTRUM

(71) Applicant: Telefonaktiebolaget LM Ericsson (publ), Stockholm (SE)

(72) Inventors: Dhruvin Patel, Aachen (DE); Guido Roland Hiertz, Aachen (DE); Mai-Anh Phan, Herzogenrath (DE); Hubertus Andreas Munz, Aachen (DE); Alexandros Palaios, Moers (DE); Reem Karaki, Aachen (DE); Torsten Dudda, Wassenberg (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 532 days.

(21) Appl. No.: 17/615,265

(22) PCT Filed: Sep. 13, 2019

(86) PCT No.: PCT/EP2019/074595
§ 371 (c)(1),
(2) Date: Nov. 30, 2021

(87) PCT Pub. No.: WO2020/244792
PCT Pub. Date: Dec. 10, 2020

(65) Prior Publication Data
US 2022/0225110 A1      Jul. 14, 2022

(30) Foreign Application Priority Data
Jun. 4, 2019     (WO) .................. PCT/EP2019/064440

(51) Int. Cl.
H04W 16/14     (2009.01)
H04W 24/08     (2009.01)
(Continued)

(52) U.S. Cl.
CPC ............ H04W 16/14 (2013.01); H04W 24/08 (2013.01); H04W 36/22 (2013.01); H04W 48/18 (2013.01);
(Continued)

(58) Field of Classification Search
CPC ..... H04W 16/14; H04W 24/08; H04W 36/22; H04W 48/18; H04W 48/20;
(Continued)

(56) References Cited

U.S. PATENT DOCUMENTS

2009/0046655 A1    2/2009  Zhao et al.
2009/0286541 A1   11/2009  Maheshwari et al.
(Continued)

FOREIGN PATENT DOCUMENTS

WO   2016010276 A1    1/2016
WO   2016164584 A1   10/2016
(Continued)

OTHER PUBLICATIONS

ETSI, "Broadband Radio Access Networks (BRAN); 5 GHz high performance RLAN; Harmonized EN covering the essential requirements of article 3.2 of the R&TTE Directive", Mar. 2015, ETSI. (Year: 2015).*

(Continued)

Primary Examiner — Michael K Phillips
(74) Attorney, Agent, or Firm — Murphy, Bilak & Homiller, PLLC

(57) ABSTRACT

Methods and apparatus are provided. In an example aspect, a method in a network node is provided, the method comprising monitoring unlicensed spectrum access attempts for transmissions to and/or from at least one User Equipment, UE, in a first group of UEs configured to use unlicensed spectrum to send uplink transmissions and/or receive downlink transmissions and, in response to the monitoring, caus-
(Continued)

ing the UEs in the first group to use licensed spectrum to send uplink transmissions and/or receive downlink transmissions.

19 Claims, 3 Drawing Sheets

(51) Int. Cl.
    *H04W 36/22* (2009.01)
    *H04W 48/18* (2009.01)
    *H04W 48/20* (2009.01)
    *H04W 72/0446* (2023.01)
    *H04W 72/0453* (2023.01)
    *H04W 72/1263* (2023.01)
    *H04W 72/23* (2023.01)
    *H04W 74/08* (2009.01)
    *H04W 74/0808* (2024.01)
    *H04W 74/0816* (2024.01)
    *H04W 36/14* (2009.01)
    *H04W 80/02* (2009.01)

(52) U.S. Cl.
    CPC ....... *H04W 48/20* (2013.01); *H04W 72/0446* (2013.01); *H04W 72/0453* (2013.01); *H04W 72/1263* (2013.01); *H04W 72/23* (2023.01); *H04W 74/0808* (2013.01); *H04W 74/0816* (2013.01); *H04W 74/0866* (2013.01); *H04W 36/1446* (2023.05); *H04W 80/02* (2013.01)

(58) Field of Classification Search
    CPC ......... H04W 72/0446; H04W 72/0453; H04W 72/1263; H04W 72/23; H04W 74/0808; H04W 74/0816; H04W 74/0866; H04W 80/02; H04W 36/0009; H04W 36/0085; H04W 36/1446; H04W 72/1215; H04W 36/26; H04L 1/08
    See application file for complete search history.

(56) References Cited

U.S. PATENT DOCUMENTS

| | | | |
|---|---|---|---|
| 2011/0007672 A1 | 1/2011 | Kim et al. | |
| 2012/0269180 A1 | 10/2012 | Li et al. | |
| 2012/0320881 A1 | 12/2012 | Hong et al. | |
| 2014/0321376 A1 | 10/2014 | Damnjanovic et al. | |
| 2014/0362780 A1 | 12/2014 | Malladi et al. | |
| 2015/0110018 A1 | 4/2015 | Rosa et al. | |
| 2016/0050667 A1* | 2/2016 | Papasakellariou | H04W 52/0251 370/329 |
| 2016/0227425 A1 | 8/2016 | Kim et al. | |
| 2016/0255643 A1 | 9/2016 | Malik et al. | |
| 2017/0202007 A1 | 7/2017 | Miao et al. | |
| 2017/0231013 A1* | 8/2017 | Ahn | H04W 74/002 |
| 2017/0279565 A1 | 9/2017 | Han et al. | |
| 2017/0353972 A1* | 12/2017 | Babaei | H04W 24/04 |
| 2018/0084509 A1* | 3/2018 | Lee | H04W 52/38 |
| 2018/0103458 A1* | 4/2018 | Tooher | H04W 16/14 |
| 2018/0124612 A1 | 5/2018 | Babaei et al. | |
| 2018/0167823 A1* | 6/2018 | Uchino | H04W 72/23 |
| 2018/0184475 A1 | 6/2018 | Babaei et al. | |
| 2018/0288623 A1 | 10/2018 | Hampel et al. | |
| 2019/0098606 A1 | 3/2019 | Sharma et al. | |
| 2019/0173611 A1 | 6/2019 | Liu et al. | |
| 2019/0349979 A1* | 11/2019 | Park | H04W 24/10 |
| 2019/0380042 A1 | 12/2019 | Niu et al. | |
| 2020/0100116 A1 | 3/2020 | Chakraborty et al. | |
| 2020/0107373 A1* | 4/2020 | Roy | H04W 74/0833 |
| 2020/0275430 A1 | 8/2020 | Salem | |
| 2020/0305052 A1 | 9/2020 | Yoshino et al. | |
| 2020/0314891 A1* | 10/2020 | Li | H04W 74/006 |
| 2020/0351669 A1* | 11/2020 | Xu | H04W 76/14 |
| 2021/0345332 A1* | 11/2021 | He | H04W 16/14 |
| 2021/0352644 A1 | 11/2021 | Zhou | |
| 2021/0392683 A1* | 12/2021 | Awadin | H04B 7/088 |

FOREIGN PATENT DOCUMENTS

| | | | | |
|---|---|---|---|---|
| WO | 2017014937 A1 | | 1/2017 | |
| WO | WO-2017134624 A1 | * | 8/2017 | ............ H04W 16/14 |
| WO | 2018052349 A1 | | 3/2018 | |
| WO | 2020244739 A1 | | 12/2020 | |

OTHER PUBLICATIONS

"3GPP TS 38.213 V15.5.0", 3rd Generation Partnership Project; Technical Specification Group Radio Access Network; NR; Physical layer procedures for control (Release 15), Mar. 2019, pp. 1-104.
"3GPP TS 38.331 V15.5.1", 3rd Generation Partnership Project; Technical Specification Group Radio Access Network; NR; Radio Resource Control (RRC) protocol specification (Release 15), Apr. 2019, pp. 1-491.
"ETSI TS 138 300 V15.6.0", 5G; NR; Overall description; Stage-2 (3GPP TS 38.300 version 15.6.0 Release 15), Jul. 2019, pp. 1-102.
"HARQ retransmissions on LAA", 3GPP TSG-RAN WG2 #89; R2-150268; Athens, Greece, Feb. 9-13, 2015, pp. 1-4.
"New WID: Support of NR Industrial Internet of Things (IoT)", 3GPP TSG RAN Meeting #83; RP-190728; Shenzhen, China, Mar. 18-21, 2019, pp. 1-6.
"Revised WID on NR-based Access to Unlicensed Spectrum", 3GPP TSG RAN Meeting #83; RP-190706; Shenzhen, China, Mar. 18-21, 2019, pp. 1-8.
"3GPP TS 38.321 V15.5.0", 3rd Generation Partnership Project; Technical Specification Group Radio Access Network; NR; Medium Access Control (MAC) protocol specification (Release 15), Mar. 2019, pp. 1-78.
"3GPP TS 23.502 V16.0.2", 3rd Generation Partnership Project; Technical Specification Group Services and System Aspects; Procedures for the 5G System; Stage 2 (Release 16), Apr. 2019, pp. 1-290.
"Timing and Synchronization for Time-Sensitive Applications", IEEE P802.1AS-Rev/D7.3, Draft Standard for Local and Metropolitan Area Networks, LAN/MAN Standards Committee of the IEEE Computer Society, Aug. 2, 2018, pp. 1-502.
"Discussion on HARQ operation for LAA", 3GPP TSG RAN WG1 Meeting #80, R1-150633, Athens, Greece, Feb. 9-13, 2015, pp. 1-12.
"ETSI EN 301 893 V2.1.1", 5 GHz RLAN; Harmonised Standard covering the essential requirements of article 3.2 of Directive 2014/53/EU, May 2017, pp. 1-122.
"Further aspects of data duplication in PDCP layer", 3GPP TSG-RAN WG2 #97, Tdoc R2-1700834, Athens, Greece, Feb. 13-17, 2017, pp. 1-3.
"QoS Control in LAA UL Operation", 3GPP TSG-RAN WG2 Meeting #89bis, R2-151176, Bratislava, Slovakia, Apr. 20-24, 2015, pp. 1-4.

* cited by examiner

```
┌─────────────────────────────────────────────────────────┐
│ Sending, to at least one User Equipment, UE, an indication of a │
│ parameter, wherein the indication of the parameter causes the at │
│ least one UE to transmit a communication by performing a Clear │
│ Channel Assessment, CCA, procedure on a first channel in │──302
│ unlicensed spectrum and, if the CCA procedure indicates that the │
│ first channel is occupied for at least a predetermined period │
│ associated with the parameter, transmitting the communication on │
│ a second channel in licensed spectrum │
└─────────────────────────────────────────────────────────┘

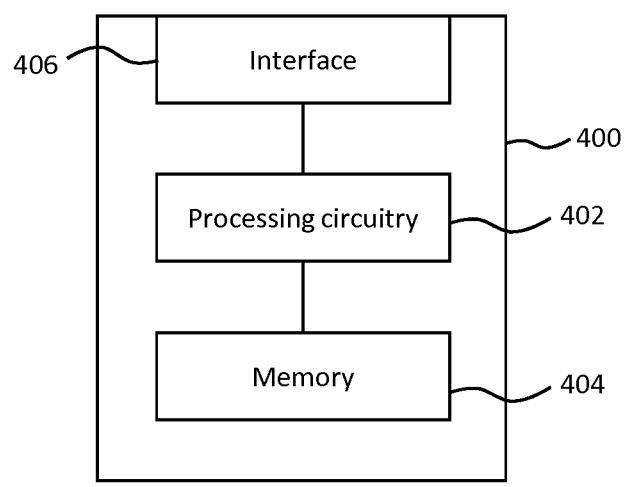

FIG. 4

USING UNLICENSED AND LICENSED SPECTRUM

TECHNICAL FIELD

Examples of the present disclosure relate to using licensed and unlicensed spectrum, such as for example transmissions to and/or from a UE.

BACKGROUND

3GPP radio technologies, such as for example Long Term Evolution (LTE) or New Radio (NR), may be used in licensed spectrum. Initiatives like Licence Assisted Access (LAA), MulteFire and NR-U are solutions to use LTE and NR in unlicensed spectrum. Using unlicensed spectrum may increase the overall capacity of a network if used in parallel to licensed spectrum.

Using unlicensed spectrum, such as for example industrial, scientific and medical (ISM) radio bands, may require the use of Clear Channel Assessment (CCA) or Listen Before Talk (LBT) Medium Access Control (MAC) schemes, in which a transmitter first senses that the transmission medium is free before using it for transmissions.

SUMMARY

One aspect of the present disclosure provides a method in a network node. The method comprises monitoring unlicensed spectrum access attempts for transmissions to and/or from at least one User Equipment, UE, in a first group of UEs configured to use unlicensed spectrum to send uplink transmissions and/or receive downlink transmissions and, in response to the monitoring, causing the UEs in the first group to use licensed spectrum to send uplink transmissions and/or receive downlink transmissions.

Another aspect of the present disclosure provides a method in a User Equipment, UE. The method comprises receiving an indication of a parameter from a network node, and transmitting a communication by performing a Clear Channel Assessment, CCA, procedure on a first channel in unlicensed spectrum. If the CCA procedure indicates that the first channel is occupied for at least a predetermined period associated with the parameter, the method also comprises transmitting the communication on a second channel in licensed spectrum.

A further aspect of the present disclosure provides a method in a network node. The method comprises sending, to at least one User Equipment, UE, an indication of a parameter, wherein the indication of the parameter causes the at least one UE to transmit a communication by performing a Clear Channel Assessment, CCA, procedure on a first channel in unlicensed spectrum and, if the CCA procedure indicates that the first channel is occupied for at least a predetermined period associated with the parameter, transmitting the communication on a second channel in licensed spectrum.

A still further aspect of the present disclosure provides apparatus comprising a processor and a memory. The memory contains instructions executable by the processor such that the apparatus is operable to monitor unlicensed spectrum access attempts for transmissions to and/or from at least one User Equipment, UE, in a first group of UEs configured to use unlicensed spectrum to send uplink transmissions and/or receive downlink transmissions and, in response to the monitoring, cause the UEs in the first group to use licensed spectrum to send uplink transmissions and/or receive downlink transmissions Another aspect of the present disclosure provides apparatus comprising a processor and a memory. The memory contains instructions executable by the processor such that the apparatus is operable to receive an indication of a parameter from a network node, and transmit a communication by: performing a Clear Channel Assessment, CCA, procedure on a first channel in unlicensed spectrum and, if the CCA procedure indicates that the first channel is occupied for at least a predetermined period associated with the parameter, transmitting the communication on a second channel in licensed spectrum An additional aspect of the present disclosure provides apparatus comprising a processor and a memory. The memory containing instructions executable by the processor such that the apparatus is operable to send, to at least one User Equipment, UE, an indication of a parameter, wherein the indication of the parameter causes the at least one UE to transmit a communication by: performing a Clear Channel Assessment, CCA, procedure on a first channel in unlicensed spectrum and, if the CCA procedure indicates that the first channel is occupied for at least a predetermined period associated with the parameter, transmitting the communication on a second channel in licensed spectrum.

A further aspect of the present disclosure provides apparatus configured to monitor unlicensed spectrum access attempts for transmissions to and/or from at least one User Equipment, UE, in a first group of UEs configured to use unlicensed spectrum to send uplink transmissions and/or receive downlink transmissions and, in response to the monitoring, cause the UEs in the first group to use licensed spectrum to send uplink transmissions and/or receive downlink transmissions.

A still further aspect of the present disclosure provides apparatus configured to receive an indication of a parameter from a network node, and transmit a communication by: performing a Clear Channel Assessment, CCA, procedure on a first channel in unlicensed spectrum and, if the CCA procedure indicates that the first channel is occupied for at least a predetermined period associated with the parameter, transmitting the communication on a second channel in licensed spectrum.

An additional aspect of the present disclosure provides apparatus configured to send, to at least one User Equipment, UE, an indication of a parameter, wherein the indication of the parameter causes the at least one UE to transmit a communication by: performing a Clear Channel Assessment, CCA, procedure on a first channel in unlicensed spectrum and, if the CCA procedure indicates that the first channel is occupied for at least a predetermined period associated with the parameter, transmitting the communication on a second channel in licensed spectrum

BRIEF DESCRIPTION OF THE DRAWINGS

For a better understanding of examples of the present disclosure, and to show more clearly how the examples may be carried into effect, reference will now be made, by way of example only, to the following drawings in which:

FIG. 3 is a flow chart of an example of a method in a network node;

FIG. 4 is a schematic of an example apparatus;

DETAILED DESCRIPTION

Figure 1:
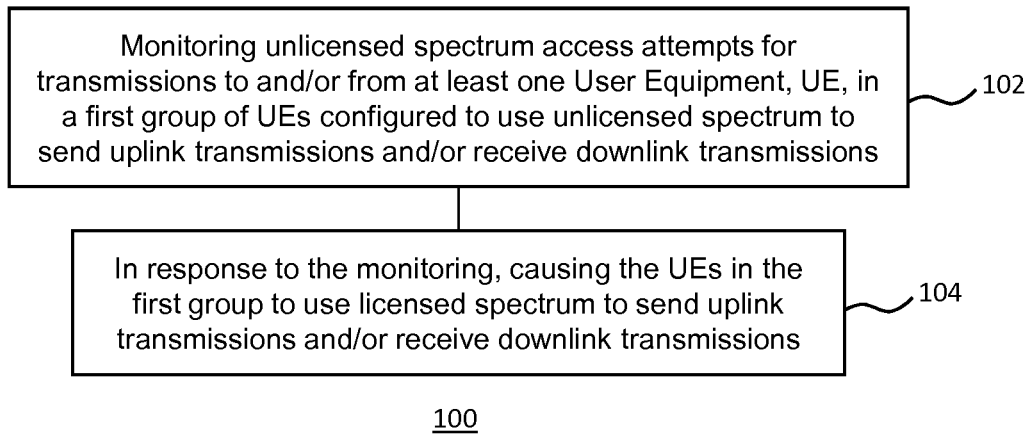
FIG. 1 is a flow chart of an example of a method in a network node.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Allowing networks to operate in shared spectrum (or unlicensed spectrum) is an approach that may increase network capacity. Although unlicensed spectrum does not match the qualities of licensed spectrum, for example in terms of reliability, bandwidth, availability and/or latency, solutions that allow an efficient use of unlicensed spectrum as a complement to licensed spectrum (such as, for example, solutions provided herein) have the potential to provide increased capacity while mitigating or avoiding at least some of the drawbacks. Some features in a network technology, such as for example LTE or NR, may need to be adapted to comply with the special characteristics of the unlicensed band as well as also different regulations. When operating in unlicensed spectrum, a device may be required to sense the medium as free before transmitting. This operation is often referred to as Listen Before Talk (LBT). Sensing may be performed in a particular channel (corresponding to a defined carrier frequency) and over a predefined bandwidth. For example, in the 5 GHz band, the sensing is performed over 20 MHz bandwidth. Examples of LBT procedures are described in standards EN 301.893, 5 GHz RLAN, Harmonized standard covering the essential requirements of article 3.2 of Directive 2014/53/EU, which is incorporated herein by reference.

Using unlicensed spectrum and/or Listen Before Talk (LBT) procedures can in some cases cause problems for applications that have a fixed upper bound on the latency of related communications. Additionally or alternatively, applications supporting high reliability and deterministic latency, such as for example URLLC (Ultra Reliable Low-Latency Communications) or HRLLC (Highly Reliable Low-Latency Communications) schemes, may not be suitable for unlicensed spectrum use, as exclusive or guaranteed use of the unlicensed wireless spectrum or unlicensed channels is not provided. URLLC, for example, has strict requirements on transmission reliability and latency, i.e., 99.9999% reliability within 1 ms one-way latency. However, it is not known at a particular time whether unlicensed spectrum is occupied (e.g. by other radio technologies such as Wi-Fi) or can be used for transmissions, and a transmitter may need to wait for a channel in unlicensed spectrum to be free (e.g. no usage of the channel is detected) before it can begin transmissions. Hence, the latency of communications using that channel cannot easily be predicted or controlled, and the reliability of communications using unlicensed spectrum cannot be guaranteed.

Embodiments disclosed herein may for example improve the latency and/or reliability of communications that are to be sent to or from one or more User Equipments (UEs) using unlicensed spectrum, for example by controlling one or more aspects of switching from using unlicensed spectrum to using licensed spectrum.

In licensed operation, uplink (UL) traffic can be scheduled with dynamic UL grants or configured UL grants. In case of dynamic grants, in the example of NR (though this may also be applied to other wireless communication technologies), the gNB may provide an UL grant to the UE for each UL transmission. Configured grants are pre-allocated, i.e. provided once to the UE, thereafter the configured UL grant is valid for usage for UL transmissions according to a configured periodicity. The UE does not need to transmit padding on those UL resources if no UL data is available for transmission, and may skip an UL transmission on such grants. The Logical channel Prioritization (LCP) procedure at the UE MAC determines the order of priority and amount of data from each logical channel to be multiplexed and transmitted in an UL transmission, i.e. when an UL grant is received. Logical channel mapping restrictions can be defined, e.g. restricting certain logical channels to be transmitted on an UL grant referring to certain serving cells or being of certain transmission duration. This way, for example, URLLC traffic requiring a particular low latency can be restricted to be transmitted on long UL slots or unreliable serving cells.

FIG. 1 is a flow chart of an example of a method 100 in a network node. The network node may be for example a base station, or any other suitable network node. The method 100 comprises, in step 102, monitoring unlicensed spectrum access attempts for transmissions to and/or from at least one User Equipment, UE, in a first group of UEs configured to use unlicensed spectrum to send uplink transmissions and/or receive downlink transmissions. For example, the monitoring may comprise monitoring unlicensed spectrum access attempts by the network node (or another network node such as a base station) for transmissions (e.g. downlink transmissions) to the at least one UE. Additionally or alternatively, the monitoring may comprise monitoring unlicensed spectrum access attempts by the at least one UE for transmissions, e.g. for uplink transmissions. In some examples, the first group of UEs may be connected to the same cell or base station. In some examples, the first group of UEs may be a subset of all UEs connected to the same cell or base station.

The method 100 also comprises, in step 104, in response to the monitoring, causing the UEs in the first group to use licensed spectrum to send uplink transmissions and/or receive downlink transmissions, by for example scheduling the uplink and/or downlink transmissions (and/or future transmissions) in licensed spectrum. For example, this may comprise sending transmissions to the UEs in the first group using licensed spectrum, or instructing the UEs in the first group to use licensed spectrum for transmissions (e.g. one or more uplink channels) instead of licensed spectrum. Thus, in some examples, the network node may conclude from the monitoring that the unlicensed spectrum is congested or that communications sent using unlicensed spectrum may experience high latency and/or low reliability. Then, for example, the network node may cause transmissions to and/or from the UEs in the first group—including, in some examples, one or more UEs whose unlicensed spectrum access attempts were not monitored—to be made instead using licensed spectrum.

In some examples, monitoring unlicensed spectrum access attempts by the at least one UE comprises monitoring at least one of a number of access attempts by the at least one UE within a predetermined time (or, for example, a rate of access attempts), a total number of access attempts by the UEs in the first group within a predetermined time (or, for example, a rate of access attempts by all of the UEs), a number of listen before talk, LBT, failures by the at least one UE within a predetermined time (or, for example, a rate of LBT failures), a length of a clear channel assessment, CCA, procedure performed by the at least one UE (where a longer CCA procedure may indicate a congested or used unlicensed spectrum or channel), and a total number of LBT failures by the UEs in the first group within a predetermined time (e.g. a rate of LBT failures for all UEs in the first group). For each parameter monitored for the at least one UE, in some examples the parameter may alternatively be monitored for multiple UEs or even all UEs in the first group. In particular examples, causing the UEs in the group of UEs to use licensed spectrum to send transmissions and/or receive downlink transmissions may be performed in response to a total number of access attempts (e.g. unsuccessful attempts) by the at least one UE or a plurality of UEs in the first group within a predetermined time exceeding a first threshold or, alternatively, a rate of access attempts (e.g. unsuccessful attempts) by multiple or all UEs in the first group.

In some examples, the UEs in the first group may be assigned a value for the predetermined time, also referred to in some examples as a delay budget. Each UE in the first group, when attempting to send a transmission using unlicensed spectrum, may perform a CCA procedure for the predetermined time, or attempt one or more LBT procedures during the predetermined time. If the procedure is not successful, and the UE has not achieved access to the unlicensed spectrum in the predetermined time, may then switch to using licensed spectrum to send the transmission. In some examples, this may comprise the UE requesting an uplink grant, and sending the transmission using licensed spectrum having been granted the uplink grant. Additionally or alternatively, the network node or a base station may perform a CCA procedure for the predetermined time, or attempt one or more LBT procedures during the predetermined time, when attempting to send a transmission to one or more of the UEs using unlicensed spectrum. If unsuccessful, the node or base station may switch to using licensed spectrum to send the transmission. In some examples, monitoring of one of access attempts for unlicensed spectrum for uplink or downlink transmissions may cause the network node to take action to ensure that the other of uplink or downlink transmissions are subsequently sent using licensed spectrum.

In some examples, UEs may be grouped into two or more groups. Thus, for example, the method 100 may comprises monitoring unlicensed spectrum access attempts for transmissions to and/or from at least one second UE in a second group of UEs configured to use unlicensed spectrum to send uplink transmissions and/or receive downlink transmissions and, in response to the monitoring, causing the UEs in the second group to use licensed spectrum to send uplink transmissions and/or receive downlink transmissions. In some examples, the UEs in the first group are associated with a predetermined time or delay budget that is different to a predetermined time or delay budget associated with the UEs in the first group. Thus, for example, the method 100 may comprise causing the UEs in the first group to use licensed spectrum to send transmissions and/or receive downlink transmissions is in response to the at least one UE in the first group performing unsuccessful unlicensed spectrum access attempts for a first clear channel assessment, CCA, period, and causing the UEs in the second group to use licensed spectrum to send transmissions and/or receive downlink transmissions is in response to the at least one UE in the second group performing unsuccessful unlicensed spectrum access attempts for a second CCA period, wherein the first CCA period has a different length to the second CCA period. Each UE may be placed in a group beforehand (e.g. a group is selected for each UE) based on one or more criteria, such as for example at least one of radio link quality experienced at the UE, traffic type of traffic sent by and/or received at the UE, a QoS parameter of the UE, and buffer size of the UE. In some examples there may be more than two groups, each with an associated delay budget or predetermined time.

In some examples, the first group may be reconfigured. For example, the method 100 may comprise sending an instruction to the UEs in the first group to reconfigure the length of the first CCA period. Additionally or alternatively, the method 100 may comprise sending an instruction to a UE in the first group to reconfigure the UE to be in the second group.

In some examples causing the UEs in the first group to use licensed spectrum to send uplink transmissions and/or receive downlink transmissions comprises sending an instruction to the UEs in the first group to use licensed spectrum. The instruction may be sent to the UEs in the first group using licensed spectrum, for example to ensure that the instruction can be received by the UEs in the event that the unlicensed spectrum is unavailable or congested.

Figure 2:
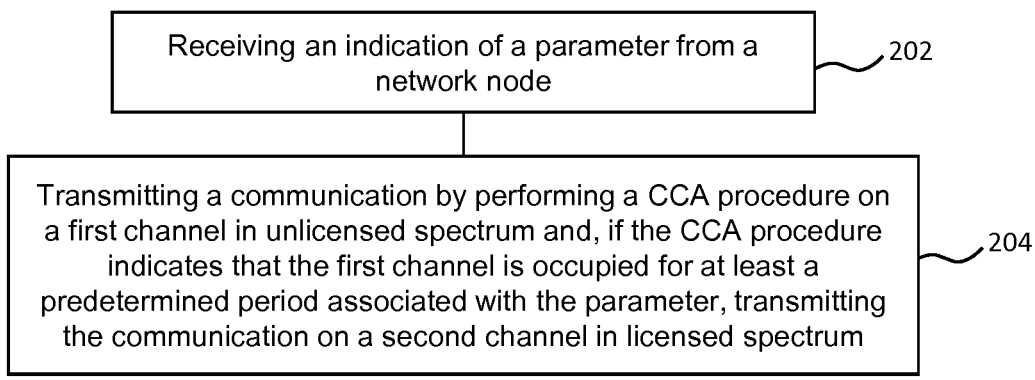
FIG. 2 is a flow chart of an example of a method in a User Equipment (UE)

FIG. 2 is a flow chart of an example of a method 200 in a User Equipment (UE). The method 200 comprises, in step 202, receiving an indication of a parameter from a network node. In some examples, the network node may be a base station or another network node, such as a network node associated with a network to which the UE is connected. The method 200 also comprises, in step 204, transmitting a communication (e.g. to a base station) by performing a Clear Channel Assessment (CCA) procedure on a first channel in unlicensed spectrum and, if the CCA procedure indicates that the first channel is occupied for at least a predetermined period associated with the parameter, transmitting the communication on a second channel in licensed spectrum, for example to a base station. Thus, for example, the UE may switch from attempting to use the unlicensed spectrum to using the licensed spectrum based on the CCA procedure, and also based on a parameter configured by the network node or the network.

In some examples, the indication of the parameter indicates one or more of the predetermined time, a maximum number of access attempts for a LBT procedure in the predetermined time (or, for example, a maximum access attempt rate), a maximum number of listen before talk, LBT, failures by the at least one UE within the predetermined time (or, for example, a maximum LBT failure rate), and a length of the CCA procedure. If, for example, the CCA procedure exceeds the predetermined time, or the rate exceeds the maximum rate, the UE may switch to using the licensed spectrum for transmitting the communication, and also in some examples for transmitting subsequent communications.

In some examples, if the CCA procedure indicates that the first channel is available within the predetermined period (e.g. following a successful or positive LBT procedure), the method 200 may comprise transmitting the communication on the first channel in unlicensed spectrum.

The communication may in some examples be associated with a logical channel, such as for example a particular uplink channel. The method 200 may then comprise for example, after transmitting the communication on the second channel in licensed spectrum, transmitting subsequent communications associated with the logical channel on the second channel in licensed spectrum. In some examples, transmitting the communication on the second channel in licensed spectrum comprises transmitting a scheduling request to the base station, and transmitting the communication after receiving a scheduling grant from the base station. In some examples, the network node comprises the base station.

FIG. 3 is a flow chart of an example of a method 300 in a network node, such as for example a base station or other network node. The method 300 comprises, in step 302, sending, to at least one User Equipment, UE, an indication of a parameter, wherein the indication of the parameter causes the at least one UE to transmit a communication by performing a Clear Channel Assessment, CCA, procedure on a first channel in unlicensed spectrum and, if the CCA procedure indicates that the first channel is occupied for at least a predetermined period associated with the parameter, transmitting the communication on a second channel in licensed spectrum. Thus, for example, the network node can control at least some aspects of the UE's unlicensed spectrum access procedure. In some examples, the UE may performed the method 200 described above.

In some examples, the indication of the predetermined period indicates one or more of the predetermined time, a maximum number of access attempts for the CCA procedure within the predetermined time (or, for example, a maximum access attempt rate), a maximum number of listen before talk, LBT, failures by the at least one UE within the predetermined time (or, for example, a maximum LBT failure rate), and a length of the CCA procedure. Failing to keep to any one or more of these requirements may thus for example cause the UE to switch to using the licensed spectrum.

In some examples, the at least one UE is in a first group of UEs, and the method comprises sending, to the UEs in the first group, an indication of the parameter, wherein the indication of the parameter causes each UE in the first group to perform a Clear Channel Assessment, CCA, procedure on a first channel in unlicensed spectrum and, if the CCA procedure indicates that the first channel is occupied for at least a predetermined period associated with the parameter, transmit the communication on a second channel in licensed spectrum. Thus, in some examples, the network node may also perform a method similar to the method 100 described above. In some examples, the method 200 may comprise sending, to UEs in a second group, an indication of a second parameter. The indication of the second parameter causes each UE in the second group to perform a Clear Channel Assessment, CCA, procedure on a first channel in unlicensed spectrum and, if the CCA procedure indicates that the first channel is occupied for at least a predetermined period associated with the second parameter, transmit the communication on a second channel in licensed spectrum. The parameter is different to the second parameter. Thus, for example, UEs may be grouped into two or more groups (e.g. using the criteria indicated above) with associated parameters, which could correspond for example to different delay budgets.

In some examples of any of the methods disclosed herein, a group of UEs may be associated with a respective group sum LBT threshold. Once the threshold is reached by the UEs in the group, e.g. during a predetermined time (or, alternatively, a predetermined LBT failure rate is met or exceeded), the group of UEs can switch over to another cell and/or switch from using unlicensed spectrum to using licensed spectrum.

At least some examples disclosed herein may enable the use of unlicensed bands for reliable type of communication, such as for example URLLC. In some examples, a group of UEs may be referred to as an Unlicensed Reliability Group (URG), and UEs may be grouped into one or more URGs. In some examples, the network controls one or more aspects of the UEs switching from using unlicensed spectrum to licensed spectrum, instead of for example being controlled by an application on the UE. Additionally, in some examples, the operator of the network may also predict how many devices should switch from using unlicensed spectrum, at the same time or around the same time, to using licensed spectrum.

Examples of this disclosure may assume that a base station or UE using 3GPP radio technology e.g. LTE or NR is being used in unlicensed spectrum along with licensed spectrum. This may be possible for example through deployment of multiple UEs on a single device, one for licensed (e.g. NR or LTE) connectivity and other for unlicensed (e.g. NR-U or LTE LAA) connectivity or any dual carrier connectivity solution.

Where UEs are grouped into one or more groups (referred to here as URGs), the UEs in one group may in some examples be associated with a single value representing a delay budget within which a UE should transmit data on unlicensed spectrum, before switching to licensed spectrum (e.g. if the UE has not yet achieved access to the unlicensed channel due to unsuccessful CCA or LBT attempts). If a UE is able to transmit within that particular time period (delay budget), the switching to licensed channel will not occur. Else, the UE will switch from the unlicensed channel to licensed channel. This may also occur from the base station side, where the base station switching from using the unlicensed spectrum to using licensed spectrum for transmissions to a UE in the URG may occur.

In some examples, if a UE fails to transmit on the unlicensed channel due to congestion or unlicensed spectrum usage, the UE may instead transmit on preconfigured resources on the licensed spectrum, or preconfigured resources on another more reliable unlicensed carrier or channel. Alternatively, the UE may be granted a scheduling grant on the licensed spectrum, e.g. from a base station, and e.g. following a scheduling request from the UE.

One of the methods to assign UEs to groups can be for example to group the UEs based on the Buffer Status Report (BSR) and/or type of data UE is expected to transmit. An example of a method for URG assignment is as follows:
1. Request: UE reports the BSR to a base station (e.g. NR-U BS) and also provides a reliability target required. This step can be optional.
2. URG calculation and assignment: Based on the requirements for each UE, the base station (or another network node) groups each UE in a URG. Assigning UEs to particular URGs can be repeated in some examples, e.g. in a periodic fashion. The base station further can update parameters associated with a new URG to UEs using e.g. control signaling.

3. URG assignment for uplink: The base station may assign URG parameters to the UE(s) in the URG, which may be used for the life time of an application on the UE for uplink transmission. For downlink the base station may have control over the transmissions.

After UEs are grouped into one or more URGs, for uplink a base station may in some examples schedule an UL transmission for a certain UE at a certain time in unlicensed spectrum. Before the UE can start transmission, it performs a CCA or LBT procedure. If the number of e.g. failed LBT operations equals or exceeds a respective parameter associated with the URG (or a respective predetermined time for gaining unlicensed spectrum access is met or exceeded for example), the UE will switch from unlicensed to the licensed channel, where the transmission (in terms of medium access) is assumed to be successful. Similar procedures may apply for example for the downlink, where the operations may be conducted at a base station.

In 3GPP, a UE configuration update procedure (e.g. as shown in ETSI TS 23.502, FIG. 4.2.4.2.1, wherein ETSI TS 23.502 is incorporated herein by reference) can be utilized to provide parameter values associated with each URG to UE(s) in the URG. In addition to existing signaling, in some examples, new signaling may be used where a UE requests an assignment or update of the URG for initial setup. Later, in some examples, the network may update UE configuration. For example, if parameters for a URG are updated, or a UE moves from one URG to another, the parameter values at the UE(s) may be updated.

Considering a particular example case where performance using unlicensed spectrum is not insufficient to meet a reliability requirement, in some examples a base station (or other network node) may be able to indicate switching of all UEs in a particular group simultaneously or substantially simultaneously. Alternatively, the base station (or other network node) may switch particular UEs from one group to another. In a particular example, that a parameter e.g. predetermined time or delay budget for a certain group may be fixed. Thus, for example, a set of UEs serving for robot control communication would have a high reliability requirement compare to UEs serving process control communication on same shop floor area under same NR-U BS, and thus may be placed into different groups (e.g. the UEs associated with the high reliability requirement may be placed into a group with a shorter delay budget or predetermined time).

FIG. 4 is a schematic of an example of apparatus 400 comprising processing circuitry 402 (e.g. one or more processors) and a memory 404 in communication with the processing circuitry 402. The memory 404 contains instructions executable by the processing circuitry 402. The apparatus 400 also comprises an interface 406 in communication with the processing circuitry 402. Although the interface 406, processing circuitry 402 and memory 404 are shown connected in series, these may alternatively be interconnected in any other way, for example via a bus.

In one embodiment, the memory 404 contains instructions executable by the processing circuitry 402 such that the apparatus 400 is operable to monitor unlicensed spectrum access attempts for transmissions to and/or from at least one User Equipment, UE, in a first group of UEs configured to use unlicensed spectrum to send uplink transmissions and/or receive downlink transmissions and, in response to the monitoring, cause the UEs in the first group to use licensed spectrum to send uplink transmissions and/or receive downlink transmissions. In some examples, the apparatus 400 is operable to carry out the method 100 described above with reference to FIG. 1.

Figure 5:
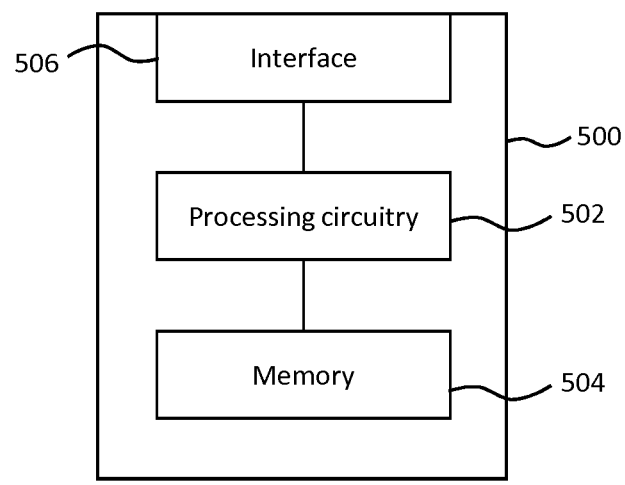
FIG. 5 is a schematic of an example apparatus.

FIG. 5 is a schematic of an example of apparatus 500 comprising processing circuitry 502 (e.g. one or more processors) and a memory 504 in communication with the processing circuitry 502. The memory 504 contains instructions executable by the processing circuitry 502. The apparatus 500 also comprises an interface 506 in communication with the processing circuitry 502. Although the interface 506, processing circuitry 502 and memory 504 are shown connected in series, these may alternatively be interconnected in any other way, for example via a bus.

In one embodiment, the memory 504 contains instructions executable by the processing circuitry 502 such that the apparatus 500 is operable to receive an indication of a parameter from a network node, and transmit a communication by: performing a Clear Channel Assessment, CCA, procedure on a first channel in unlicensed spectrum and, if the CCA procedure indicates that the first channel is occupied for at least a predetermined period associated with the parameter, transmitting the communication on a second channel in licensed spectrum. In some examples, the apparatus 500 is operable to carry out the method 200 described above with reference to FIG. 2.

Figure 6:
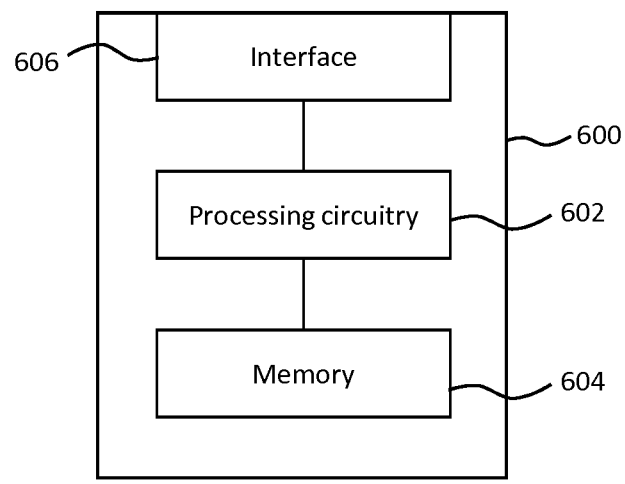
FIG. 6 is a schematic of an example apparatus.

FIG. 6 is a schematic of an example of apparatus 600 comprising processing circuitry 602 (e.g. one or more processors) and a memory 604 in communication with the processing circuitry 602. The memory 604 contains instructions executable by the processing circuitry 602. The apparatus 600 also comprises an interface 606 in communication with the processing circuitry 602. Although the interface 606, processing circuitry 602 and memory 604 are shown connected in series, these may alternatively be interconnected in any other way, for example via a bus.

In one embodiment, the memory 604 contains instructions executable by the processing circuitry 602 such that the apparatus 600 is operable to send, to at least one User Equipment, UE, an indication of a parameter, wherein the indication of the parameter causes the at least one UE to transmit a communication by performing a Clear Channel Assessment, CCA, procedure on a first channel in unlicensed spectrum and, if the CCA procedure indicates that the first channel is occupied for at least a predetermined period associated with the parameter, transmitting the communication on a second channel in licensed spectrum. In some examples, the apparatus 600 is operable to carry out the method 300 described above with reference to FIG. 3.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order

The invention claimed is:

1. A method in a network node, the method comprising:
monitoring unlicensed spectrum access attempts for transmissions to and/or from a first User Equipment (UE) in a first group of UEs configured to use unlicensed spectrum to send uplink transmissions and/or receive downlink transmissions, wherein the monitoring comprises monitoring a total number of access attempts by the first UE within a predetermined period; and
in response to the total number of access attempts by the first UE within the predetermined period exceeding a first threshold, causing the UEs in the first group to use licensed spectrum to send uplink transmissions and/or receive downlink transmissions.

2. The method of claim 1, wherein monitoring unlicensed spectrum access attempts by the first UE further comprises monitoring at least one of the following:
a total number of listen before talk (LBT) failures by the first UE within a predetermined period, and
a length of a clear channel assessment (CCA) procedure performed by the first UE.

3. The method of claim 1, further comprising:
monitoring unlicensed spectrum access attempts for transmissions to and/or from at least one second UE in a second group of UEs configured to use unlicensed spectrum to send uplink transmissions and/or receive downlink transmissions; and
in response to the monitoring, causing the UEs in the second group to use licensed spectrum to send uplink transmissions and/or receive downlink transmissions.

4. The method of claim 3, wherein:
causing the UEs in the first group to use licensed spectrum to send transmissions and/or receive downlink transmissions is in response to the first UE in the first group performing unsuccessful unlicensed spectrum access attempts for a first clear channel assessment (CCA) period;
causing the UEs in the second group to use licensed spectrum to send transmissions and/or receive downlink transmissions is in response to the at least one second UE in the second group performing unsuccessful unlicensed spectrum access attempts for a second CCA period; and
the first CCA period has a different length to the second CCA period.

5. The method of claim 4, further comprising sending an instruction to the UEs in the first group to reconfigure the length of the first CCA period.

6. The method of claim 4, further comprising sending an instruction to a particular UE in the first group to reconfigure the particular UE to be in the second group.

7. The method of claim 3, further comprising assigning each particular one of the UEs to the first group or to the second group based on at least one of the following: radio link quality experienced at the particular UE, type of traffic sent by and/or received at the particular UE, a quality of service (QOS) parameter of the particular UE, and buffer size of the particular UE.

8. The method of claim 1, wherein causing the UEs in the first group to use licensed spectrum to send uplink transmissions and/or receive downlink transmissions comprises scheduling the uplink and/or downlink transmissions in licensed spectrum.

9. The method of claim 1, wherein causing the UEs in the first group to use licensed spectrum to send uplink transmissions and/or receive downlink transmissions comprises sending an instruction to the UEs in the first group to use licensed spectrum.

10. The method of claim 9, wherein the instruction is sent via licensed spectrum.

11. The method of claim 1, wherein the UEs in the first group are configured to use unlicensed spectrum to send uplink transmissions to a base station and/or receive downlink transmissions from a base station.

12. A method in a User Equipment (UE), the method comprising:
performing a Clear Channel Assessment (CCA) procedure on a first channel in unlicensed spectrum, wherein the CCA procedure includes up to a maximum number of access attempts on the first channel within a predetermined period;
when the CCA procedure indicates that the first channel is occupied for at least the predetermined period, based on the maximum number of access attempts for the CCA procedure being performed within the predetermined period, transmitting a communication on a second channel in licensed spectrum, wherein the communication is associated with a logical channel; and
after transmitting the communication on the second channel in licensed spectrum, transmitting subsequent communications associated with the logical channel on the second channel in licensed spectrum, without attempting to use the unlicensed spectrum for transmission of the subsequent communications.

13. The method of claim 12, further comprising receiving from a network node an indication of one or more parameters for the CCA procedure, including one or more of the following: the predetermined period, the maximum number of access attempts for the CCA procedure within the predetermined period, a maximum number of listen before talk (LBT) failures by the VE within the predetermined period, and a length of the CCA procedure.

14. The method of claim 13, further comprising, when the CCA procedure indicates that the first channel is available within the predetermined period, transmitting the communication on the first channel in unlicensed spectrum.

15. The method of claim 14, wherein the communication is transmitted to a base station.

16. The method of claim 15, wherein transmitting the communication on the second channel in licensed spectrum comprises:
transmitting a scheduling request to the base station, and
transmitting the communication after receiving a scheduling grant from the base station responsive to the scheduling request.

17. The method of claim 16, wherein the network node comprises the base station.

18. A network node comprising:
a processor; and
a memory operably coupled to the processor and containing executable instructions, wherein execution of the instructions by the processor causes the network node to:
monitor unlicensed spectrum access attempts for transmissions to and/or from a first User Equipment (UE) in a first group of UEs configured to use unlicensed spectrum to send uplink transmissions and/or receive downlink transmissions, including monitoring a total number of access attempts by the first UE within a predetermined period; and
in response to the total number of access attempts by the first UE within the predetermined period exceeding a first threshold, cause the UEs in the first group to use licensed spectrum to send uplink transmissions and/or receive downlink transmissions.

19. A user equipment (UE) comprising:
a processor; and
a memory operably coupled to the processor and containing executable instructions, wherein execution of the instructions by the processor causes the UE to perform operations corresponding to the method of claim 12.

* * * * *